United States Patent
Wu

[11] Patent Number: 5,848,841
[45] Date of Patent: Dec. 15, 1998

[54] HAND-HELD TYPE STIRRING DEVICE ADAPTED FOR USE IN CONTAINERS OF DIFFERENT SIZES

[76] Inventor: Ching-Miin Wu, No. 45-2, Sec. 2, Chieh Tung Road, Chieh Tung Village, Ta Tsun Hsiang, Chang Hua Hsien, Taiwan

[21] Appl. No.: 960,334

[22] Filed: Oct. 29, 1997

[51] Int. Cl.⁶ .................................................. A47J 43/044
[52] U.S. Cl. ............................................................ 366/129
[58] Field of Search ................................. 366/129, 130, 366/197, 342–344

[56] References Cited

U.S. PATENT DOCUMENTS

| | | | |
|---|---|---|---|
| 2,805,050 | 9/1957 | Choppinet | 366/129 X |
| 3,299,924 | 1/1967 | Hanschitz | 366/129 X |
| 3,333,830 | 8/1967 | Spingler et al. | 366/129 |
| 4,405,998 | 9/1983 | Brison | 366/343 X |
| 4,850,699 | 7/1989 | Rebordosa | 366/343 X |
| 5,368,384 | 11/1994 | Duncan et al. | 366/129 |

FOREIGN PATENT DOCUMENTS

| | | | |
|---|---|---|---|
| 1170120 | 5/1964 | Germany | 366/129 |
| 288357 | 5/1953 | Switzerland | 366/129 |

*Primary Examiner*—Charles E. Cooley
*Attorney, Agent, or Firm*—Beveridge, DeGrandi, Weilacher & Young, LLP

[57] ABSTRACT

A handheld type stirring device including a body, a dust protective cover, and a stirring rod. A divergent end of a bowl-shaped dust protective cover is fitted over a corresponding bowl-shaped portion of the body, and a funnel-shaped top portion of the stirring rod is fitted in between an outer water seal ring and an inner dust protective ring of the dust protective cover. The spindle of a motor within the body is positioned in a receiving notch of the top portion of the stirring rod. Any fine particles generated during rotation of the motor are received in the dust protective cover. The bowl-shaped portion and the dust protective cover together ensures that the mouth of a container can be properly closed during stirring even if they are placed obliquely on the container's opening.

1 Claim, 4 Drawing Sheets

HAND-HELD TYPE STIRRING DEVICE ADAPTED FOR USE IN CONTAINERS OF DIFFERENT SIZES

BACKGROUND OF THE INVENTION (a) Field of the Invention:

The present invention relates generally to a stirring device, and more particularly to a hand-held type stirring device adapted for use in containers of different sizes.

(b) Description of the Prior Art:

Conventional hand-held stirring devices are generally comprised of a body and a stirring rod, driven by a motor. They are not provided with any means that can prevent food being stirred from getting into the motor. In addition, they cannot avoid spilling liquid food from the container during stirring.

SUMMARY OF THE INVENTION

Accordingly, a primary object of the present invention is to provide a hand-held type stirring device adapted for use in containers of different sizes in which a body has a bowl-shaped portion and a dust protective cover is substantially shaped like a bowl so that when the body and the dust protective cover are placed over the opening of a container, they can effectively close the opening even if they are obliquely placed.

Another object of the present invention is to provide a hand-held type stirring device which can avoid spilling of food from the container during stirring and prevents fine particles generated during rotation of the motor from scattering into the container.

In order to achieve the above-mentioned objects, the present invention comprises a body, a dust protective cover, and a stirring rod. The body is a box-like structure and includes a bowl-shaped portion at a bottom side, an upper cover covering the upper side, an interior in which are disposed a motor and two battery seats one being on each side of the motor, and a press switch on one side of the body. The bowl-shaped portion has a divergent end in contact with the bottom side of the body and a convergent end centrally provided with a tiny hole through which a spindle of the motor passes. The body further has guide posts spaced around the outer periphery of the divergent end of the bowl-shaped portion. The dust protective cover is substantially bowl-shaped and has a divergent end that completely covers the bowl-shaped portion of the body. The dust protective cover is peripherally provided with lugs which match the guide posts and includes an outer water seal ring and an inner dust protective ring at a convergent end thereof. The stirring rod includes a funnel-shaped top portion, a centrally disposed insert post with a receiving notch adapted to receive and position the spindle of the motor, and a bottom rod portion with stirring elements projecting therefrom. In use, the divergent end of the dust protective cover is fitted over the bowl-shaped portion of the body, and the funnel-shaped top portion of the stirring rod is fitted in between the outer water seal ring and the inner dust protective ring of the dust protective cover such that the spindle of the motor is positioned in the receiving notch of the top portion. Any fine particles generated during rotation of the motor are received in the dust protective cover. The bowl-shaped portion and the dust protective cover together ensures that the mouth of a container can be properly closed during stirring even if they are placed obliquely on the container's opening.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
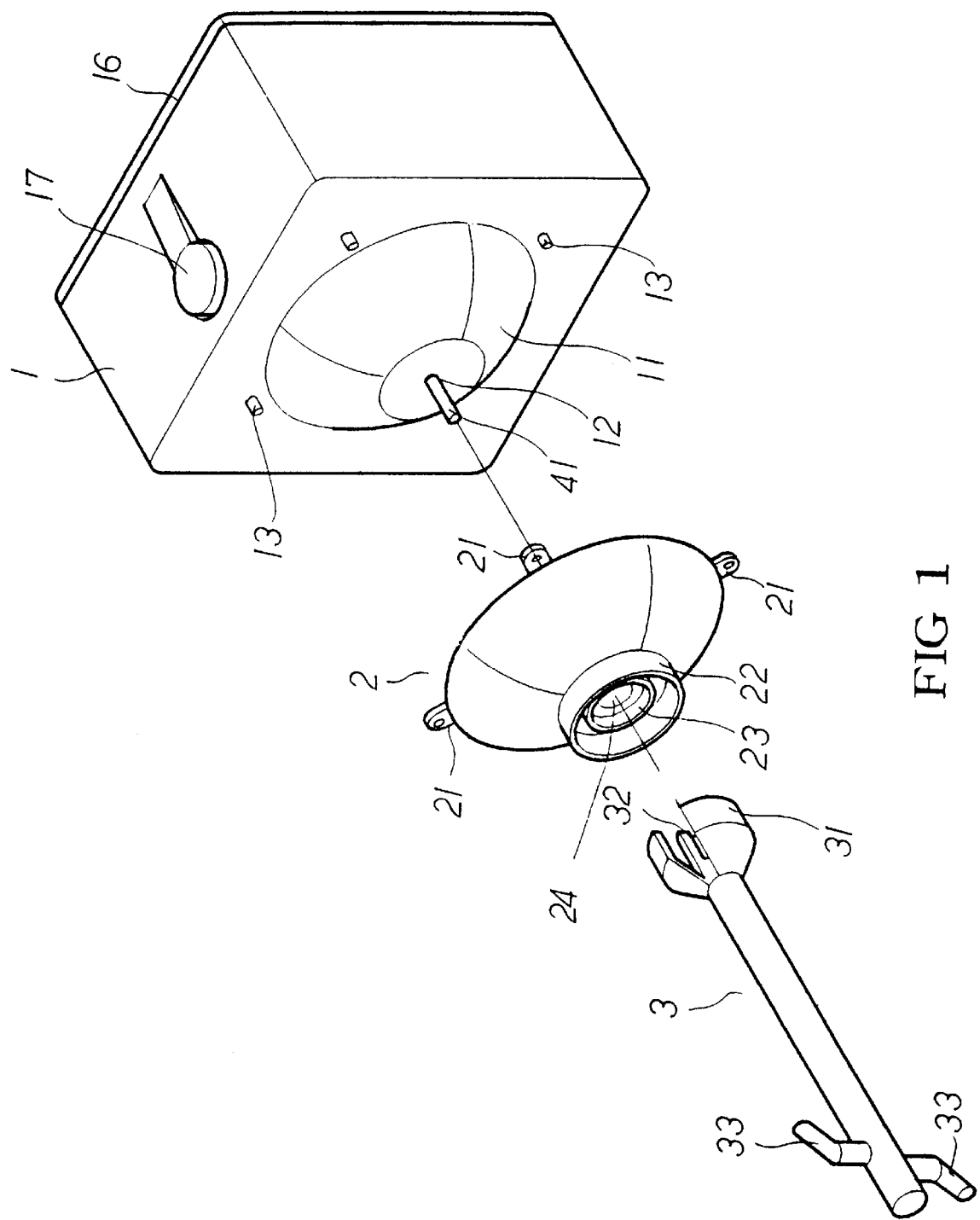
FIG. 1 is a perspective exploded view of the present invention.
Figure 2:
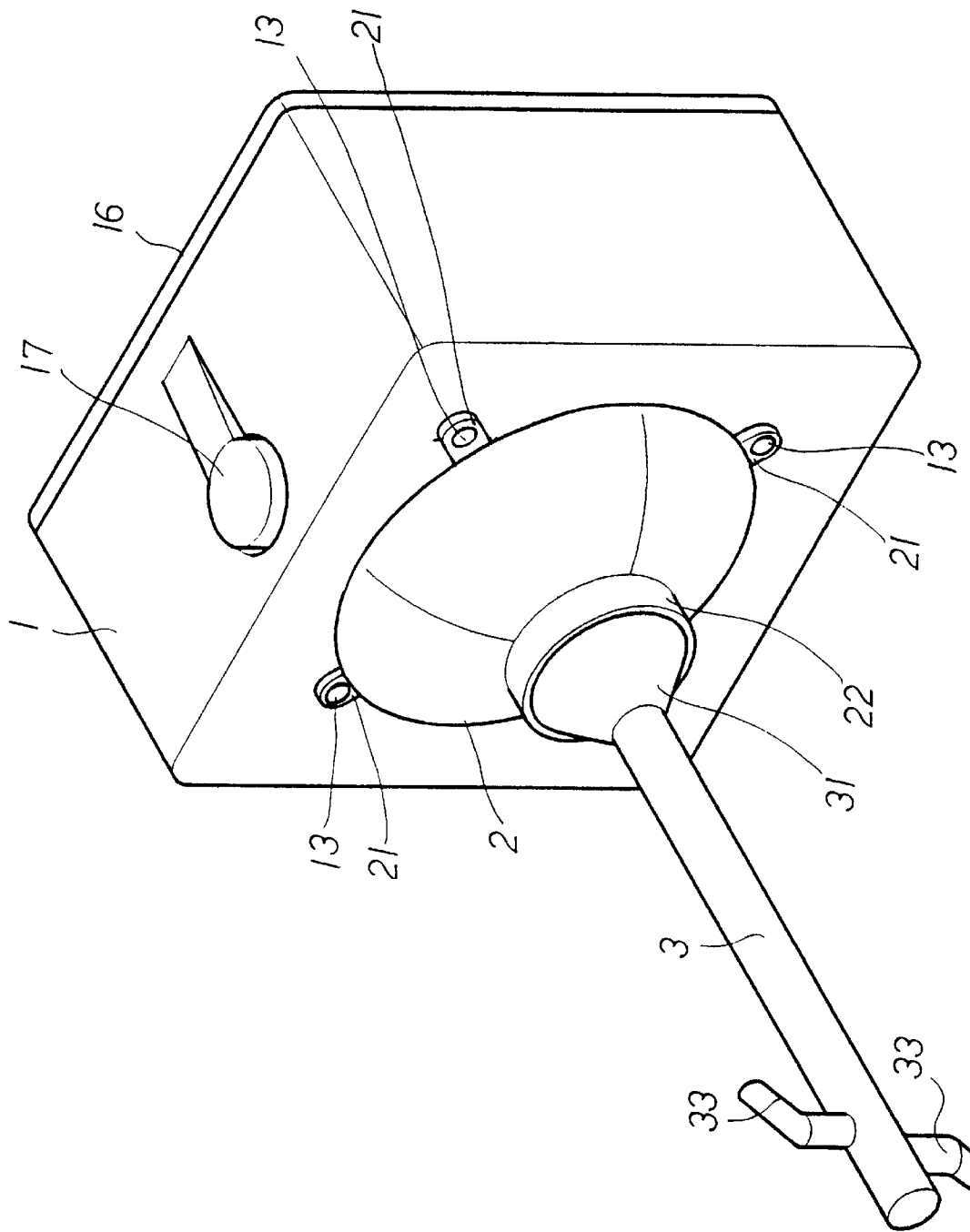
FIG. 2 is a perspective view of the present invention.
Figure 3:
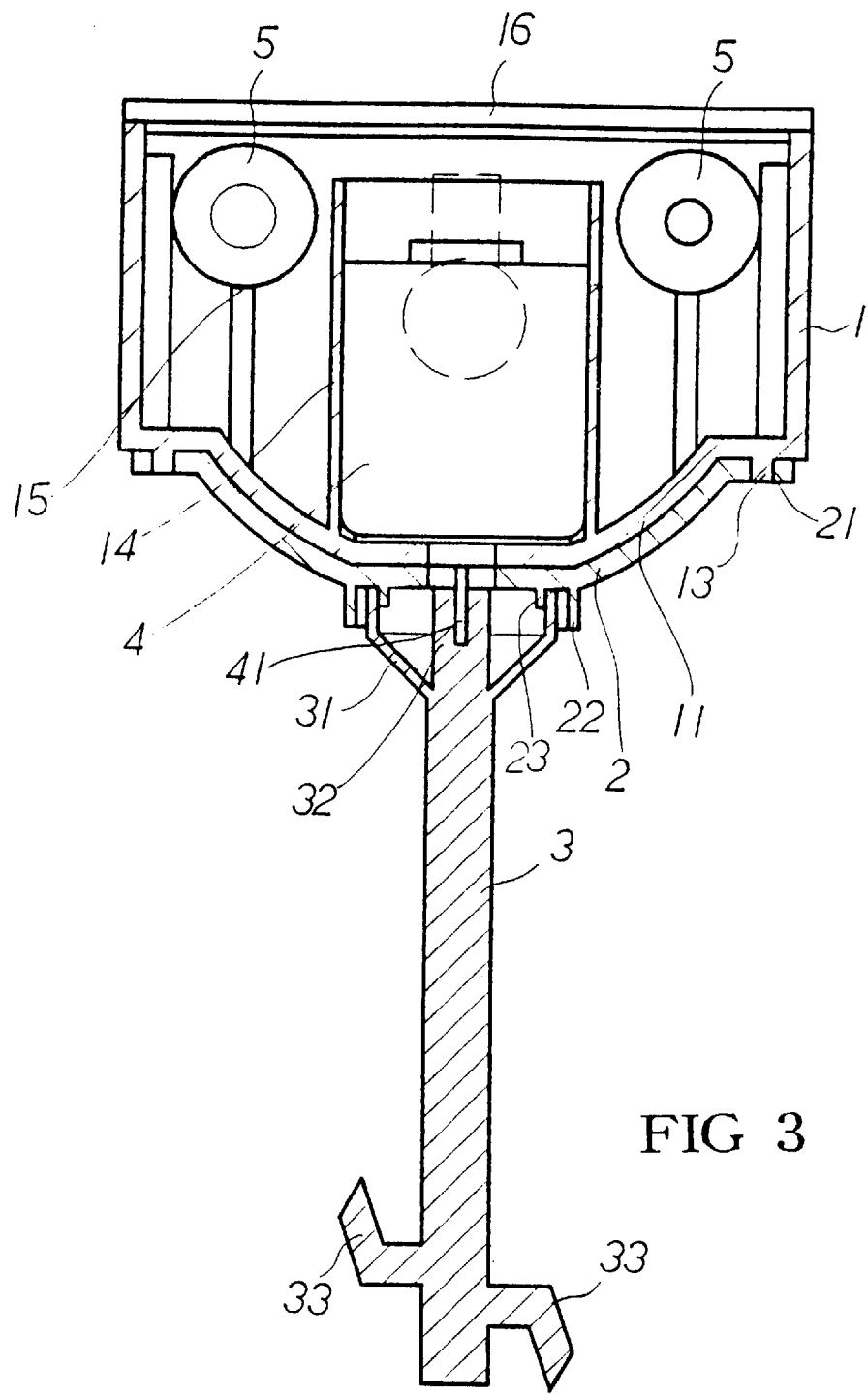
FIG. 3 is a side sectional view of the present invention.

The hand-held type stirring device according to the present invention is adapted for use in containers of different diameters. With reference to FIGS. 1, 2, and 3, the present invention comprises a body 1, a dust protective cover 2, a stirring rod 3.

The body 1 is a box structure with a top side, a bottom side, and four sides. The body 1 includes a bowl-shaped portion 11 projecting from the bottom side thereof. The bowl-shaped portion 11 has a divergent end in contact with the body 1, while a convergent end thereof is centrally provided with a tiny hole 12 adapted to allow passage of a spindle 41 of a motor 4 therethrough. A plurality of guide posts 13 are diametrically provided around the bowl-shaped portion 11 on the bottom side of the body 1. The body 1 has an interior in which a securing seat 14 is disposed, with a battery seat 15 at either end of the securing seat 14. The top side of the body 1 is covered by an upper cover 16; a press switch 17 is disposed on one side of the body 1.

The dust protective cover 2 is made of soft material and is substantially bowl-shaped such that it completely covers up the bowl-shaped portion 11 of the body 1. A divergent end of the dust protective cover 2 is circumferentially provided with lugs 21 which match the guide posts 13, while a convergent end thereof is provided with an outer water seal ring 22 and an inner dust protective ring 23. The inner dust protective ring 23 is centrally provided with a hole 24 adapted to allow passage of the spindle 41 of the motor 4 therethrough.

The stirring rod 3 includes a funnel-shaped top portion 31, a centrally disposed insert post 32 with a receiving notch, and stirring elements 33 projecting from a bottom portion of the stirring rod 3. In FIG. 1, two opposed L-shaped stirring elements 33 are arranged in opposite directions at the bottom portion of the stirring rod 3.

In use, the insert post 32 of the stirring device 3 is fitted onto the spindle 41 of the motor 4 so that the spindle 41 is held in the receiving notch of the insert post 32, whereas a divergent end of the top portion 31 of the stirring rod 3 is fitted between the inner protective ring 23 and the outer water seal ring 22 of the dust protective cover 2. Such an arrangement prevents any tiny particles produced as a result of friction between the spindle 41 and the insert post 32 during operation from falling into the food being stirred as well as avoids penetration of liquid.

Figure 4:
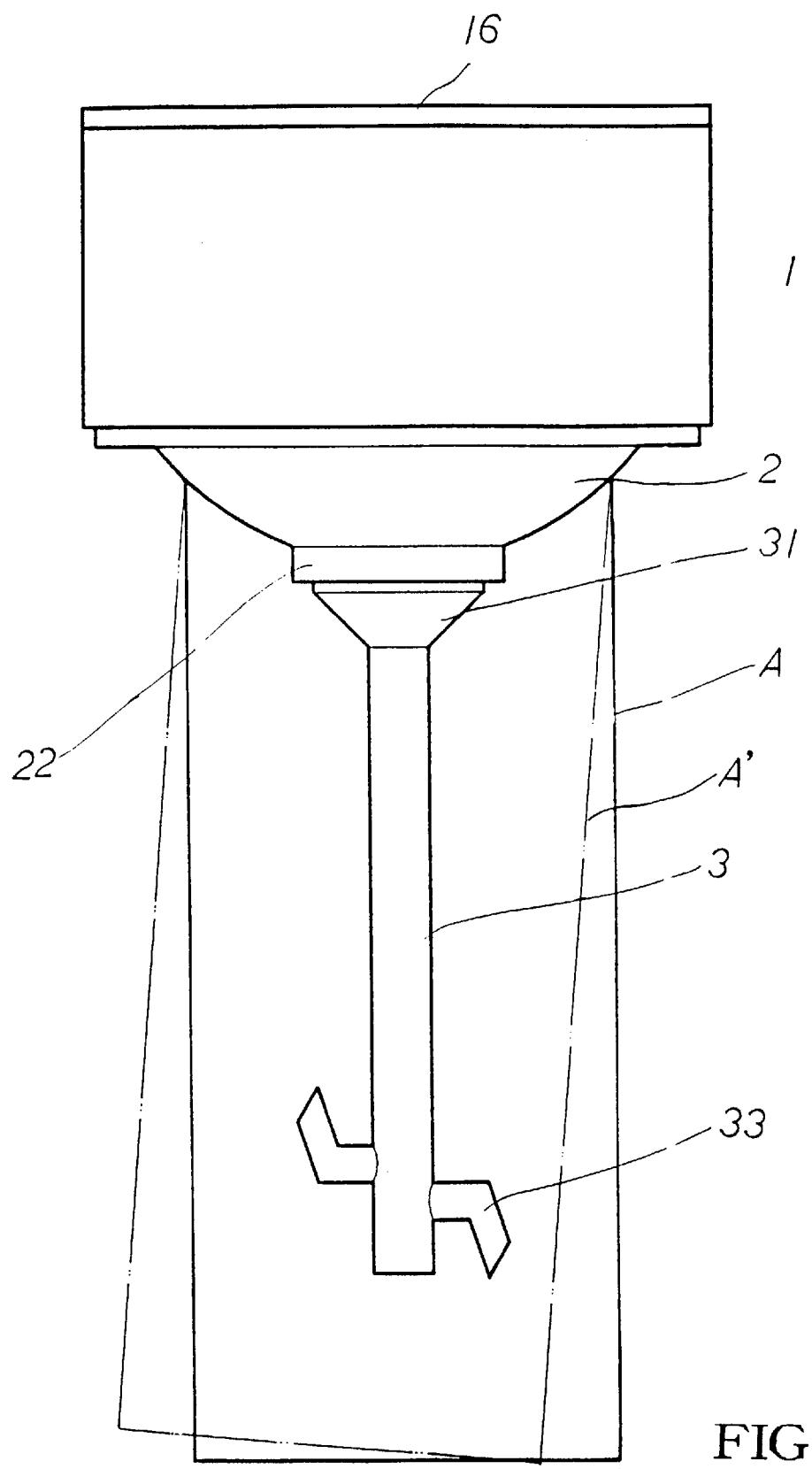
FIG. 4 is a side view of the present invention in use.

Operation of the present invention is now described with reference to FIG. 4. After batteries 5 are installed into the battery seats 15 in the body 1, and the press switch 17 is pressed, the motor 4 drives the stirring rod 3. In the present invention, the bowl-shaped portion 11 of the body 1 and the protective cover 2 fitted over the bowl-shaped portion 11 are so configured as to completely cover a cup opening or a jar opening A of a corresponding size even if they are obliquely set on the cup or jar opening A. Therefore, in use, even if a container A' or the body 1 is obliquely placed, the powder or mixed liquids in the container A' will not spill therefrom. Besides, the outer dust protective ring 22 prevents scattering of powder due to friction, while the water seal ring 23 ensures that when the liquid in the container is drawn by a centrifugal force and rises along the walls of the container, the liquid will fall down upon reaching the outer water seal ring 23. Hence, the food or liquids inside the container will not penetrate into the body 1 during the process of stirring.

Although the present invention has been illustrated and described with reference to the preferred embodiment thereof, it should be understood that it is in no way limited to the details of such embodiment but is capable of numerous modifications within the scope of the appended claims.

What is claimed is:

1. A hand-held type stirring device adapted for use in containers of different diameters, comprising:

a body in the form of a box having a top side, a bottom side, and four sides, said body including a bowl-shaped portion extending from said bottom side, an upper cover covering said top side, an interior in which are disposed a motor securing seat adapted to receive a motor and two battery seats, one of said seats being disposed at each side of said motor securing seat, and a press switch disposed on one side of said body, said bowl-shaped portion including a divergent end in contact with said bottom side of said body and a convergent end centrally provided with a small hole through which a spindle of the motor passes, said body further having a plurality of guide posts disposed around said divergent end of said bowl-shaped portion;

a dust protective cover made of a soft material and being substantially shaped like a bowl with a divergent end that completely covers up said bowl-shaped portion of said body and a convergent end provided with an outer water seal ring and an inner dust protective ring, said inner dust protective ring being centrally provided with a small hole adapted to allow passage of the spindle of the motor therethrough, said divergent end of said dust protective cover being peripherally provided with a plurality of lugs disposed for matching with said guide posts of said body; and a stirring rod having a substantially funnel-shaped top portion, a centrally disposed insert post with a receiving notch, and a bottom rod portion having stirring elements projecting from either side thereof, said receiving notch receiving a distal end of the spindle when said insert post is fitted over the spindle, whereby said divergent end of said funnel-shaped top portion of said stirring rod is fitted in between said outer water seal ring and said inner dust protective ring to prevent scattering of powder; said bowl-shaped portion of said body and said dust protective cover ensures that when a liquid inside a container rises with the centrifugal force generated during stirring it falls down into the container when it reaches said outer water seal ring, thus preventing the liquid from penetrating into said spindle of said motor, said bowl-shaped portion of said body and said dust protective cover further capable of completely closing the mouth of the container even if said bowl-shaped portion of said body and said dust protective cover are placed obliquely over the opening of the container.

* * * * *